US008010850B2

(12) United States Patent  (10) Patent No.: US 8,010,850 B2
Kruse et al.  (45) Date of Patent: Aug. 30, 2011

(54) CLIENT EXTENDED ERROR HANDLING

(75) Inventors: David Kruse, Kirkland, WA (US); V. Kishore Chintalapati, Redmond, WA (US); Sean Watson, Seattle, WA (US); Jay Paulus, Seattle, WA (US); Dustin Friesenhahn, Seattle, WA (US); Ahmed Mohamed, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 11/598,489

(22) Filed: Nov. 13, 2006

(65) Prior Publication Data

US 2007/0204012 A1   Aug. 30, 2007

Related U.S. Application Data

(63) Continuation-in-part of application No. 11/217,626, filed on Aug. 31, 2005, and a continuation-in-part of application No. 11/243,350, filed on Oct. 4, 2005, now abandoned.

(51) Int. Cl.
   *G07F 11/00* (2006.01)
(52) U.S. Cl. ............ 714/57; 714/39; 715/201; 709/203; 709/219; 709/225; 709/227; 709/230
(58) Field of Classification Search .................. 709/217, 709/225, 227, 230; 714/39; 715/201
   See application file for complete search history.

(56) References Cited

U.S. PATENT DOCUMENTS

| | | | |
|---|---|---|---|
| 5,121,475 A * | 6/1992 | Child et al. .................. 715/201 |
| 5,491,822 A | 2/1996 | Allen | |
| 5,600,826 A | 2/1997 | Ando | |
| 5,732,219 A * | 3/1998 | Blumer et al. ................ 709/227 |
| 5,793,966 A | 8/1998 | Amstein | |
| 5,848,234 A | 12/1998 | Chernick | |
| 5,935,211 A | 8/1999 | Osterman | |
| 5,956,483 A | 9/1999 | Grate | |
| 5,999,979 A | 12/1999 | Vellanki | |
| 6,012,087 A | 1/2000 | Freivald | |
| 6,067,558 A | 5/2000 | Wendt | |
| 6,128,653 A | 10/2000 | Del Val | |
| 6,208,427 B1 | 3/2001 | Lee | |
| 6,208,640 B1 | 3/2001 | Spell | |
| 6,208,952 B1 | 3/2001 | Goertzel | |
| 6,243,396 B1 | 6/2001 | Somers | |

(Continued)

FOREIGN PATENT DOCUMENTS

GB   2351573   3/2001

OTHER PUBLICATIONS

G. Clemm, "Version Extensions to WebDAV", Mar. 2002, The Internet Society, Version RFC 3253, pp. 1-100.*

(Continued)

*Primary Examiner* — Robert Beausoliel
*Assistant Examiner* — Jeison C Arcos
(74) *Attorney, Agent, or Firm* — Merchant & Gould P.C.

(57) ABSTRACT

Techniques for clients and servers to use the web authoring extensions, and in particular, extended error handling to allow servers to provider richer web authoring error information to clients. One technique includes sending an authoring request to a server, receiving a response message with extended error information by a client, and sending the extended error information to an application program. Other embodiments are described and claimed.

12 Claims, 16 Drawing Sheets

U.S. PATENT DOCUMENTS

| | | | |
|---|---|---|---|
| 6,253,217 B1 | 6/2001 | Dourish | |
| 6,260,148 B1 | 7/2001 | Aggarwal et al. | |
| 6,266,701 B1 | 7/2001 | Sridhar | |
| 6,269,380 B1 | 7/2001 | Terry | |
| 6,332,127 B1 | 12/2001 | Bandera | |
| 6,351,748 B1 | 2/2002 | Deen | |
| 6,356,907 B1 | 3/2002 | Hopmann | |
| 6,356,920 B1 | 3/2002 | Vandersluis | |
| 6,401,097 B1 | 6/2002 | McCotter | |
| 6,408,298 B1 | 6/2002 | Van | |
| 6,408,336 B1 | 6/2002 | Schneider | |
| 6,415,327 B1 | 7/2002 | Beckerman | |
| 6,449,633 B1 | 9/2002 | Van | |
| 6,526,435 B1 | 2/2003 | Lippert | |
| 6,526,439 B1 | 2/2003 | Rossmann | |
| 6,557,040 B1 | 4/2003 | Friedman | |
| 6,581,099 B1 | 6/2003 | Deen | |
| 6,615,231 B1 | 9/2003 | Deen et al. | |
| 6,629,127 B1 | 9/2003 | Deen | |
| 6,654,794 B1* | 11/2003 | French | 709/217 |
| 6,658,476 B1 | 12/2003 | Van | |
| 6,675,353 B1 | 1/2004 | Friedman | |
| 6,691,119 B1 | 2/2004 | Lippert | |
| 6,694,335 B1 | 2/2004 | Hopmann et al. | |
| 6,748,470 B2 | 6/2004 | Goldick | |
| 6,760,886 B1 | 7/2004 | Nadon | |
| 6,839,735 B2 | 1/2005 | Wong | |
| 6,842,770 B1 | 1/2005 | Serlet et al. | |
| 6,944,642 B1 | 9/2005 | Hopmann | |
| 6,947,991 B1 | 9/2005 | Burton | |
| 6,985,936 B2 | 1/2006 | Agarwalla et al. | |
| 7,117,303 B1* | 10/2006 | Zayas et al. | 711/112 |
| 7,254,636 B1* | 8/2007 | O'Toole et al. | 709/230 |
| 2002/0091738 A1 | 7/2002 | Rohrabaugh | |
| 2002/0156840 A1* | 10/2002 | Ulrich et al. | 709/203 |
| 2002/0156891 A1* | 10/2002 | Ulrich et al. | 709/225 |
| 2003/0046366 A1 | 3/2003 | Pardikar | |
| 2003/0050964 A1 | 3/2003 | Debaty et al. | |
| 2003/0074392 A1 | 4/2003 | Campbell | |
| 2003/0200283 A1* | 10/2003 | Suryanarayana et al. | 709/219 |
| 2004/0078695 A1* | 4/2004 | Bowers et al. | 714/39 |
| 2004/0122897 A1 | 6/2004 | Seelemann, II | |
| 2004/0163037 A1* | 8/2004 | Friedman et al. | 715/501.1 |
| 2004/0163086 A1 | 8/2004 | Friedman | |
| 2004/0167983 A1 | 8/2004 | Friedman | |
| 2004/0193940 A1 | 9/2004 | Snyder | |
| 2004/0215747 A1 | 10/2004 | Maron | |
| 2005/0033776 A1 | 2/2005 | Kircher et al. | |
| 2005/0055333 A1 | 3/2005 | Deen | |
| 2005/0223082 A1* | 10/2005 | Sankaran et al. | 709/219 |
| 2006/0126809 A1 | 6/2006 | Halpern | |
| 2006/0150036 A1 | 7/2006 | Pierce et al. | |

OTHER PUBLICATIONS

Clemm, "Web Distributed Authoring and Versioning (WebDAV) Access Control Protocol", May 2004, WebDAV, pp. 1-62.*

Clemm, "Versioning Extension to WebDAV (Web Distributed Authoring and Versioning)", Mar. 2002, WebDAV, pp. 1-100.*

Goland, "HTTP Extensions for Distributed Authoring—WebDAV", Feb. 1999, WebDAV, pp. 1-92.*

Whitehead, "Web Distributed Authoring and Versioning (WebDAV) Ordered Collectionsl Protocol", Dec. 2003, WebDAV, pp. 1-32.*

Fielding, "Hypertext Transfer Protocol—HTTP/1.1", Jun. 1999, The internet society, p. 1-176.*

"Apache based WebDAV Server with LDAP and SSL," 5.1. Restricting access to DAV shares; accessed Oct. 7, 2005 at: http://www.tldp.org/HOWTO/Apache-WebDAV-LDAP-HOWTO/x383.html.

Braginski et al., "Distributed Authoring and Versioning Extensions for HTTP Enable Tam Authoring," Jun. 1999, accessed on Oct. 7, 2005 at: http://www.microsoft.com/msj/0699/dav/dav.aspx.

Carlson, R. et al., "Guidelines for Next Hop Client (NHC) Developers," RFC 2583, May 1999, 9 pages.

Dridi, Fredj; Newmann, Gustaf; "How to Implement Web-based Groupware Systems based on WebDAV," Infrastructure for Collaborative Enterprises, Stanford, CA; Jun. 1999, 7 pages.

Fielding R. et al., "Hypertext Transfer Protocol—HTTP/1.1," RFC 2068, Jan. 1997, 145 pages.

Freed, N., "SMTP Service Extension for Returning Enhanced Error Codes," FRC 2034, Oct. 1996, 6 pages.

Goland; "HTTP Extensions for Distributed Authoring," WEBDAV; Introduction; RFC 2518, Feb. 1999, 83 pages, accessed Oct. 7, 2005 at: http://asg.web.cmu.edu/rfc/rfc2518.html.

Hunt, James J.; Reuter, Jurgen; "Using the Web for Document Versioning: an Implementation Report for DeltaV," proceedings of the 23$^{rd}$ International Conference; May 12-19, 2001, pp. 507-513.

IBM Personal Computer Seminar Proceedings, "The IBM PC Network Program," vol. 2, No. 5, Sep. 1984, 13 pages.

IBM Virtual Telecommunications Access Method, "VTAM" (no document).

Shepler, S. et al., "Network File System (NFS) Version 4 Protocol," RFC 3530, Apr. 2003, 275 pages.

Slein, J., et al., "Requirements for a Distributed Authoring and Versioning Protocol for the World Wide Web," RFC 2291, Feb. 1998, 19 pages.

Vaudreuil, G., "Enhanced Mail System Status Codes," RFC 1893, Jan. 1996, 15 pages.

Whitehead, Jr., "Lessons from WebDAV for the Next Generation Web Infrastructure (abstract)," accessed Oct. 7, 2005 at: http://www.ics.uci.edu/~ejw/http-future/whitehead/http_pos_paper.html.

Whitehead, Jr., E. James, "World WideWeb Distributed Authoring and Versioning (WebDAV): An Introduction," vol. 5, No. 1; Mar. 1997; pp. 3-8.

O'Shields et al., "WebDAV: A Web-Writing Protocol and More", Date: Feb. 2004 to Apr. 2004, vol. 20, No. 2, http://nait.org/jit/Articles/oshields012004.pdf.

Shadgar et al., "Adapting Databases and WebDAV Protocol", Date: May 2004, http://www.www2004.org/proceedings/docs/1p612.pdf.

Whitehead, Jr. et al., "The WebDAV Property Design", http://www.goland.org/spe-whitehead.pdf.

Yu et al.; Supporting Distributed Workflow Using Extended HTTP, Copyright 1994-2010, pp. 45-47.

* cited by examiner example POST+UNLOCK request:

228
```
POST http://www.example.com/name_of_file.htm
...
Content-Type: application/x-www-form-urlencoded; charset=utf-8; ...
Lock-Token: opaquelocktoken:{3932E32A-8825-494E-A19E-
E714A7A741A8}20041130T183232Z
X-MSDAVEXTLockTimeout: second-0
...
<content>
```
222 → Lock-Token line
224 → X-MSDAVEXTLockTimeout line

| | | 222 | 224 | 226 |
|---|---|---|---|---|
| | HTTP verb (220) | headers Lock-Token: | X-MSDAVEXT LockTimeout: | result |
| 144 | GET\|POST | Y | N | FAIL |
| | GET\|POST | Y | Y | FAIL - if token doesn't match<br>LOCK - if no existing lock at server<br>REFRESH - if X-MSDAVEXTLockTimeout ≠ 0<br>UNLOCK - if X-MSDAVEXTLockTimeout = 0 |
| | GET\|POST | N | Y | sent lock token:<br>FAIL - if file is already locked<br>FAIL - if file is locked & X-...Lock-Timeout=0<br><br>didn't send lock token:<br>LOCK - if no existing lock at server |
| | GET\|POST | N | N | return file |
| 146 | PUT | Y | N | success - if token matched<br>FAIL - if token mismatch or file not locked |
| | PUT | Y | Y | FAIL - if token doesn't match<br>LOCK - if no existing lock at server<br>REFRESH - if X-MSDAVEXTLock-Timeout ≠ 0<br>UNLOCK - if X-MSDAVEXTLock-Timeout = 0 |
| | PUT | N | Y | sent lock token:<br>FAIL - if file is already locked<br>FAIL - if file is locked & X-...Lock-Timeout=0<br><br>didn't send lock token:<br>LOCK - if no existing lock at server |
| | PUT | N | N | return file | example PUT+REFRESH request:

230
```
PUT http://www.example.com/somefile/name_of_file.htm
...
Content-Type: application/x-www-form-urlencoded; charset=utf-8; ...
X-MSDAVEXTLockTimeout: second-120
Lock-Token: opaquelocktoken:{3932E32A-8825-494E-A19E-
E714A7A741A8}20041130T183232Z
...
<content>
```

| HTTP verb | header | | result |
|---|---|---|---|
| | Content-type: | X-MSDAVEXT: | (effective method) |
| GET | multipart/MSDAVEXTPrefixEncoded | PROPFIND | GET+PROPFIND |
| POST | multipart/MSDAVEXTPrefixEncoded | PROPFIND | POST+PROPFIND |
| PUT | multipart/MSDAVEXTPrefixEncoded | PROPPATCH | PUT+PROPPATCH |
| PUT | multipart/MSDAVEXTPrefixEncoded | PROPFIND | PUT+PROPFIND |

240    242

246 example GET+PROPFIND request:

```
POST /shared%20documents//Copy%20of%20Folder/test.rtf HTTP/1.1
```

```
translate: f
User-Agent: Microsoft-WebDAV-MiniRedir/5.2.3790
Host: office
Connection: Keep-Alive
Pragma: no-cache
X-MSDAVEXT: PROPFIND
Content-type: ...
...
```

242

250 example GET+PROPFIND response:

```
HTTP/1.1 200 OK
```

```
Date: Tue, 25 Jan 2005 03:12:31 GMT
Server: Microsoft-IIS/6.0
MicrosoftSharePointTeamServices: 6.0.2.6361
X-Powered-By: ASP.NET
Last-Modified: Thu, 12 Feb 2004 02:33:01 GMT
ETag: "{3E94207C-8E12-4491-B0FF-A903E2C9610E},7"
ResourceTag: rt:3E94207C-8E12-4491-B0FF-A903E2C9610E@00000000007
Content-type: multipart/MSDAVEXTPrefixEncoded ; ...
Cache-Control: private
X-MSDAVEXTLockTimeout: Second-####
Lock-Token: opaquelocktoken:{4A7A741A8}20041130T183232Z
Content-Length: #####
Public-Extension: http://schemas.microsoft.com/repl-2
```

240    (some number of seconds)

(size of body) 248

248

```
<length of properties section>
<properties>
<length of resource>
<resource>
```

FIG. 9

270 example PUT+PROPPATCH+UNLOCK request:

```
PUT /shared%20documents/Copy%20of%20Folder/test.rtf HTTP/1.1

...
translate: f
User-Agent: Microsoft-WebDAV-MiniRedir/5.2.3790
Host: dustinfrserver
Content-Length: 114234
Connection: Keep-Alive
X-MSDAVEXT: PROPPATCH
X-MSDAVEXTLockTimeout: Second-0
Lock-Token: opaquelocktoken:{4A7A741A8}20041130T183232Z
Content-type: multipart/MSDAVEXTPrefixEncoded
Pragma: no-cache
Authorization: NTLM
...

<length of properties section><some pushed properties>
<length of resource><some PUT resource subject to the pushed properties>
```

272 example PUT+PROPPATCH+UNLOCK response:

```
HTTP/1.1 200 OK

HTTP/1.1 200 OK
Date: Tue, 30 Nov 2004 18:32:34 GMT
Server: Microsoft-IIS/6.0
X-Powered-By: ASP.NET
MicrosoftSharePointTeamServices: 6.0.2.5530
Cache-Control: private
Content-Length: 0
Public-Extension: http://schemas.microsoft.com/repl-2
```

FIG. 10

290 example POST+PROPFIND+LOCK request:

POST /shared%20documents/Copy%20of%20Folder/test.rtf HTTP/1.1 translate: f
User-Agent: Microsoft-WebDAV-MiniRedir/5.2.3790
Host: dustinfrserver
Connection: Keep-Alive
X-MSDAVEXT: PROPFIND
X-MSDAVEXTLockTimeout: Second-60
Content-Length: 0
Pragma: no-cache
Authorization: NTLM
...

292 example POST+PROPFIND+LOCK response:

HTTP/1.1 200 OK

Date: Tue, 30 Nov 2004 18:32:34 GMT
Server: Microsoft-IIS/6.0
X-Powered-By: ASP.NET
MicrosoftSharePointTeamServices: 6.0.2.5530
Cache-Control: private
Content-Length: 1056
Content-type: multipart/MSDAVEXTPrefixEncoded ; ...
X-MSDAVEXTLockTimeout: Second-60
Lock-Token: opaquelocktoken:{4A7A741A8}20041130T183232Z
Public-Extension: http://schemas.microsoft.com/repl-2
...

00000000000001F4
<500 bytes of some returned properties>
000000000000020C
<524 bytes of some posted resource>

| Extended Error code (Decimal) | an error code which the client can map to a system-level error code |
|---|---|
| String (URL Encoded) | a string with extended information for clients to use |

302

| HTTP/1.1 401 Unauthorized |
|---|
| Content-Length: 1656<br>Content-Type: text/html<br>X-MSDAVEXT_ERROR: 2342; The file is checked out to "Redmond\dustinfr"<br>Server: Microsoft-IIS/6.0<br>WWW-Authenticate: NTLM<br>X-Powered-By: ASP.NET<br>MicrosoftSharePointTeamServices: 12.0.0.000<br>Date: Tue, 25 Jan 2005 03:11:51 GMT<br>... |

FIG. 12

CLIENT EXTENDED ERROR HANDLING

CROSS-REFERENCE TO RELATED APPLICATION(S)

This application is a Continuation-In-Part and claims the benefit of U.S. patent application Ser. No. 11/217,626, filed Aug. 31, 2005, titled "COMPOUNDING OF HTTP AUTHORING PROTOCOL", and U.S. patent application Ser. No. 11/243,350, filed Oct. 4, 2005, titled "EXTENDED HTTP ERROR CHANNEL," which are both incorporated herein by reference.

BACKGROUND

FIG. 1 shows an HTTP message 50. The exchange of HTTP messages 50 between an HTTP client 52 and an HTTP server 54 is well known in the art of client-server computing. Various RFCs and other public documents may be consulted for details about the various versions and variations of HTTP. For instance, RFC 2616 defines HTTP version 1.1. According to RFC 2616, an HTTP message 50 that is for an HTTP request has a request line 54, such as "GET/HTTP/1.1". An HTTP message 50 that is for an HTTP response instead has a status line 56, such as "HTTP/1.1 200 OK". A request line 54 or status line 56 is usually followed by one or more headers, each consisting of a field name 60 and, depending on the particular header, zero or more field bodies 62. A message 50 may end with a message body 64, depending on the type of request or response. Details relating to delimiters, particular headers, and other features of HTTP messages and HTTP communication can be found elsewhere.

FIG. 2 shows an example HTTP request 80 and an example HTTP response 82. The HTTP client 52 sends request 80 over a data network 84 to the HTTP server 54, which handles the request and returns the response 82. The request 80 includes a request line 87 and a number of headers 88 (some requests also have a message body). The response 82 includes a status line 89, headers 90, and a message body 92. HTTP communications need not travel over a network such as network 84; communication between a local client and a local server is possible, albeit usually through the local system's communications stacks.

A shortcoming with HTTP is that it does not provide for authoring through an HTTP channel. That is, the standard HTTP specifications do not specifically provide for clients to manage resources on servers. There is no way for a client to perform resource management operations like copying resources (e.g., files, documents, etc.), moving resources on a server, setting or obtaining properties of resources on a server, locking resources, and so on. In response to this shortcoming, various public and private extensions to HTTP have been devised.

FIG. 3 shows some method extensions 100 and header extensions 102 of a protocol or extension of HTTP that adds remote authoring functionality on top of HTTP. These extensions are from RFC 2518, which defines "HTTP Extensions for Web Authoring and Versioning", or "WebDAV". WebDAV is a superset of HTTP that is sometimes referred to as a protocol, and sometimes referred to as an extension of HTTP. The WebDAV protocol defines conventions, methods 100, and headers 102, for requests and responses that otherwise comply with HTTP. That is, WebDAV requests and responses follow the basic format of HTTP messages (e.g., message 50 in FIG. 1). Technically, some of the verbs in the web authoring methods 100 are defined as valid HTTP verbs, however, their functionality is extended by WebDAV. For example, PUT is part of HTTP, but WebDAV extends its functionality to collections, directories, folders, etc. The same basic HTTP communication rules are used, the same line/field/body delimiters are used, the same error codes may be used, and base HTTP methods 104 and base HTTP headers can appear in WebDAV messages. For example an ordinary HTTP OPTIONS request may be answered by a WebDAV-compliant server with a response that has standard HTTP headers as well as one or more non-standard HTTP headers that indicate the availability of one or more HTTP extensions on the server. In general, this manner of extending HTTP allows servers and clients to handle both base HTTP communications as well as various extensions thereto, even if a remote system does not support an extension that is supported locally; unsupported headers and methods are usually ignored or handled gracefully.

The WebDAV extension to HTTP provides functionality to create, change and move documents on a remote server (typically a web server). WebDAV implementations are useful, among other things, for remotely authoring documents or resources served by a web server. WebDAV implementations can also be used for general access-anywhere web-based file storage. Many operating systems, such as Windows, Linux, and Mac OSX provide built-in client and server support for WebDAV, thus allowing transparent use of files on a WebDAV server somewhat as if they were stored in a local directory.

The methods and headers of WebDAV are fully documented elsewhere, however, the main methods are: PUT—put a resource or collection on the server; DELETE—delete a resource or collection from the server; PROPFIND—retrieve properties (as XML) of a resource; PROPPATCH—change and delete properties of a resource; MKCOL—create collections or directories; COPY—copy a resource from one URI to another on the server; MOVE—move a resource from one URI to another on the server; LOCK—put a lock on a resource; UNLOCK—remove a lock from a resource. Some notable headers (field names) are: destination—specifies a URI as a destination resource for methods such as COPY and MOVE; Lock-Token—specifies a token that identifies a particular lock; and Timeout—specifies a duration of a lock.

It has not previously been recognized that there are certain inefficiencies and weaknesses built into WebDAV that can become significant in certain circumstances. FIG. 4 shows a timeline for a sequence of related authoring requests. Suppose that a user of HTTP client 52 would like to get and lock a resource on HTTP server 54. The user will first direct the client 52 to get a particular resource. The client 52 will generate and transmit a GET request 120 to the server 54. The server 54 handles the GET request 120 and returns an appropriate response 122. The round trip time is the time between client 52's transmission of the GET request 120 and the receipt of response 122. As can be seen in FIG. 4, much of the round trip time can be attributed to the time that it takes for the GET request 120 and the response 122 to traverse the network. If the user also needs to lock the resource obtained by GET request 120, another round of communication is needed: client 52 sends discrete LOCK request 124; LOCK request 124 passes through the network; and the server 54 replies with a response 126 that also crosses the network. The second exchange has its own round trip time that may include significant network transmission time. The total time 128 to meet two related needs of the client 52 (the need to both get and lock a resource) includes the time for two round trips or four network transmissions. Furthermore, the two discrete requests 120, 124 require approximately twice the server overhead as a single request, which might cause further delay if the server is heavily loaded.

Another problem with the example in FIG. 4 is that the requested resource could be modified or locked by another client (or the server 54 itself) between the time that client 52 requests the resource and the time the client 52 is able to obtain a lock on the resource. In other words, another request can affect the resource after it is received by the client 52 but before the client 52 is able to obtain a lock on the resource, which could cause an error or unexpected result.

Yet another problem with the example in FIG. 4 is that there is typically no technique for notifying a client of the different types of errors that might occur when attempting to provide for authoring through an HTTP channel. The HTTP protocol and various operating systems for a client may provide a standard set of error codes and definitions to indicate to a client when errors occur at the server. For example, when a file cannot be opened, the HTTP protocol may return an error code and message indicating "file access denied." In many cases, such error codes and messages are static and provide limited information. Further, the WebDAV protocol and its various public and private extensions may provide a different set of undefined errors that are unknown to the client. In such cases, the client may have insufficient information to identify and troubleshoot the underlying problem creating the undefined error condition.

The atomic nature of WebDAV and the inability of WebDAV clients and servers to use compound or multi-aspect authoring requests with one discrete exchange may have other problems and inconveniences. Without necessity, some embodiments discussed below may alleviate some problems associated with HTTP authoring.

SUMMARY

The following summary is included only to introduce some concepts discussed in the Detailed Description below. This summary is not comprehensive and is not intended to delineate the scope of protectable subject matter, which is set forth by the claims presented at the end.

In various embodiments, a client may send a compounded or uncompounded web authoring request on behalf of an application program that creates a file system error at a server. The server may communicate extended error information for the file system error using any response message modified to include a new extended error header or variants. The client may be arranged to process, store and manage the extended error information so that it may be consumed by various application programs. In one embodiment, for example, the application programs may be modified to explicitly or implicitly request the extended error information. In one embodiment, for example, the extended error information may be automatically provided to the application programs as with standard error handling routines. Once an application program receives the extended error information, the application program may display the extended error information for a user. In some cases, an application program may be arranged to perform subsequent actions in response to the extended error information. Other embodiments are described and claimed.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

FIG. 8 shows how requests can be formatted to invoke compounded locking.

FIG. 9 shows a mechanism for compounding property methods with HTTP or WebDAV methods or verbs.

FIG. 10 shows further compounded methods.

FIG. 11 shows an example POST+PROPFIND+LOCK method request and a corresponding response.

FIG. 12 shows an error handling table and examples of a response using extended error handling.

DETAILED DESCRIPTION

Figure 5:
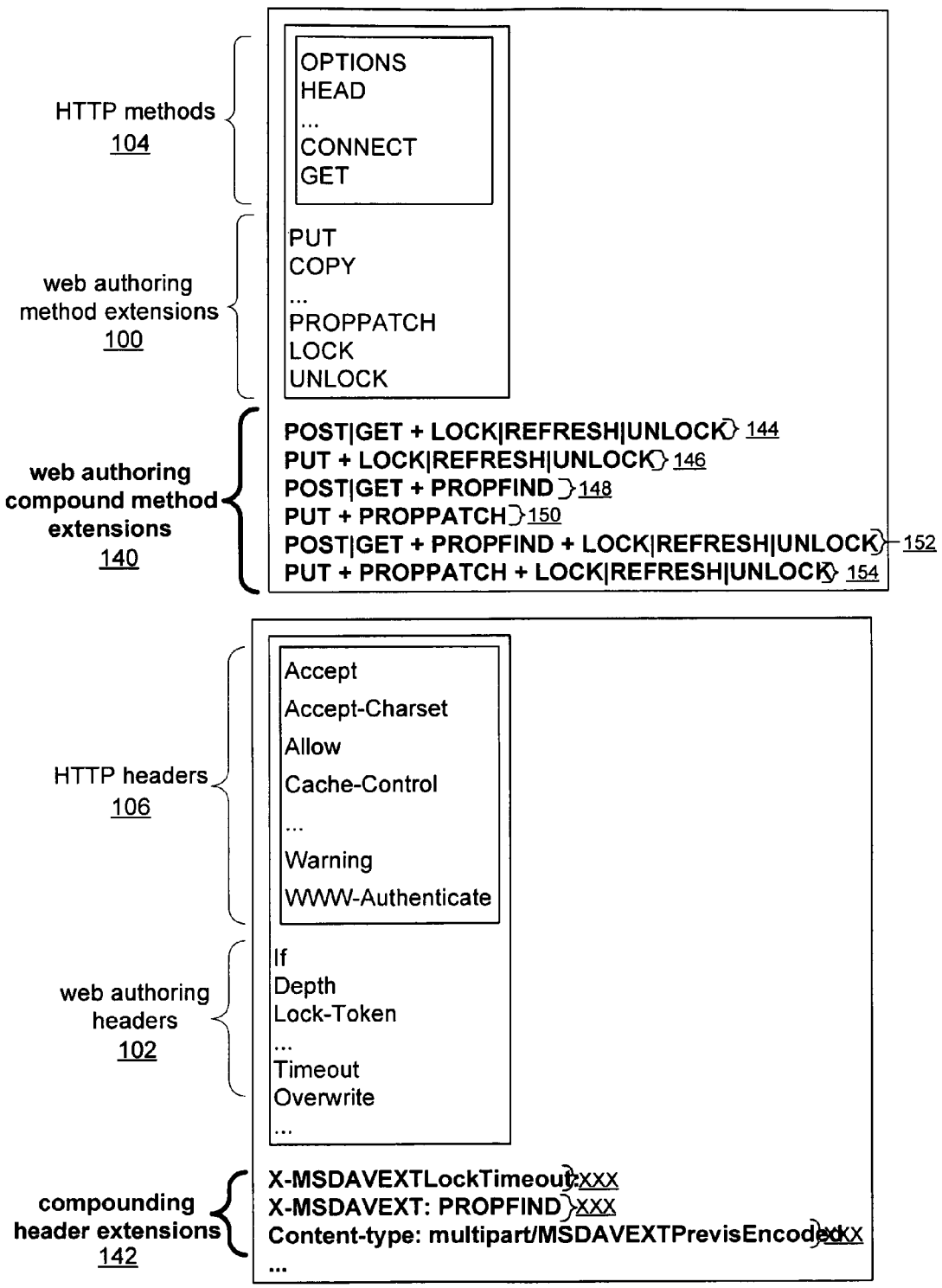
FIG. 5 shows some web authoring method extensions and compounding header extensions that can be used to allow clients and servers to compound two or more authoring related methods with single client-server exchanges.

FIG. 5 shows some web authoring method extensions 140 and compounding header extensions 142 that can be used to allow clients and servers to compound two or more authoring related methods with single client-server exchanges. Although the method extensions 140 are characterized as "methods", they need not involve verbs or request lines 54 that are different than those defined by HTTP and WebDAV. However, conceptually, the method extensions 140 discussed below effectuate compound authoring methods. As discussed below, these in-effect compound authoring method extensions 140 can be accomplished using various compounded header extensions 142.

In the Figures, the symbols "+" and "|" (vertical bar) respectively represent compounding and "or". So, for example, the "POST|GET+LOCK|REFRESH|UNLOCK" method 144 represents a number of discrete compound methods: "POST+LOCK", "POST+UNLOCK", "GET+LOCK", etc. An explanation of how the method extensions 140 can be implemented using header extensions 142 will follow. Methods 144 and 146 will be discussed with reference to FIG. 8. Methods 148 and 150 will be discussed with reference to FIG. 9. Methods 152 and 154 will be discussed with reference to FIGS. 10 and 11.

Figure 1:
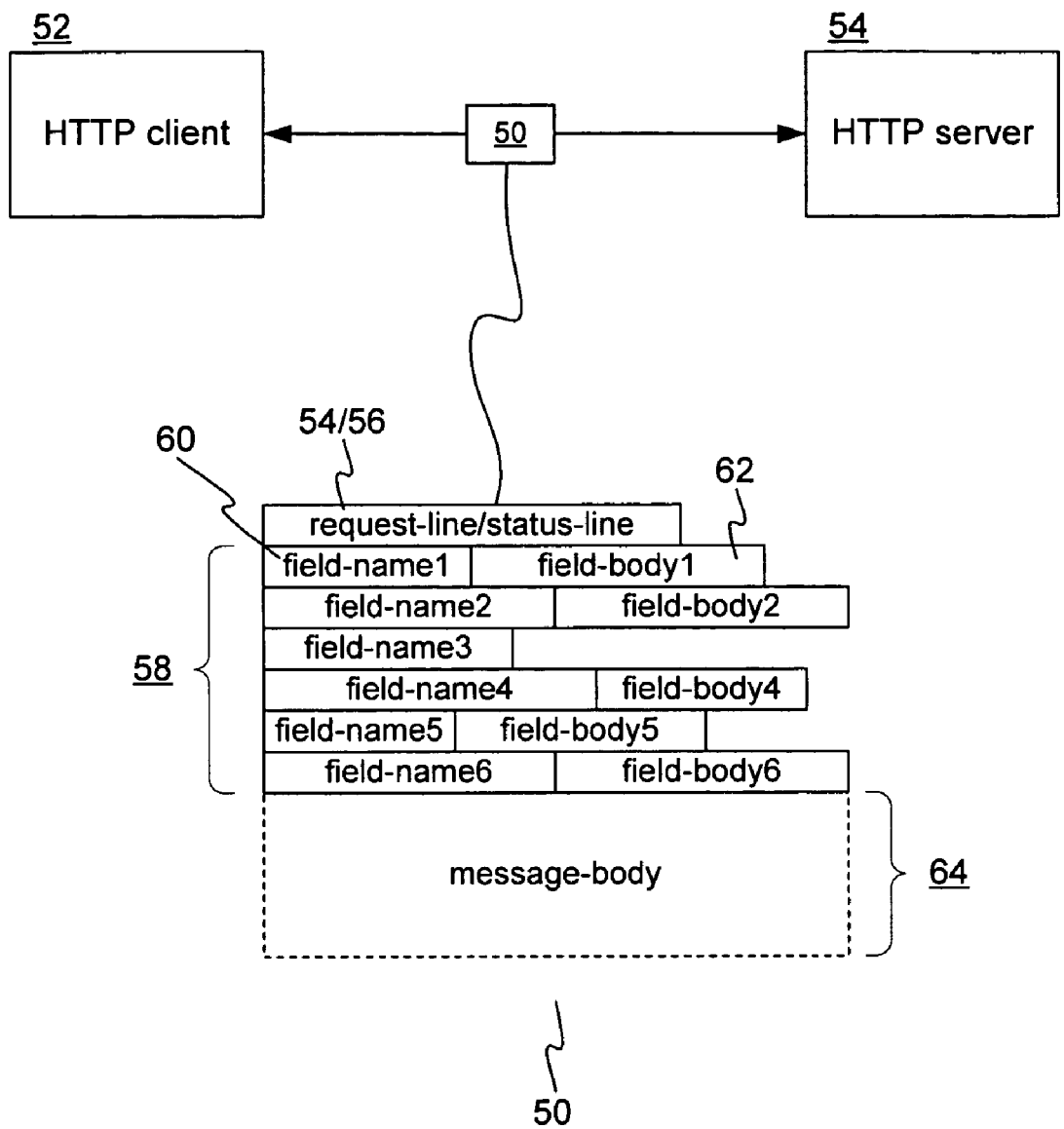
FIG. 1 shows an HTTP message.
Figure 2:
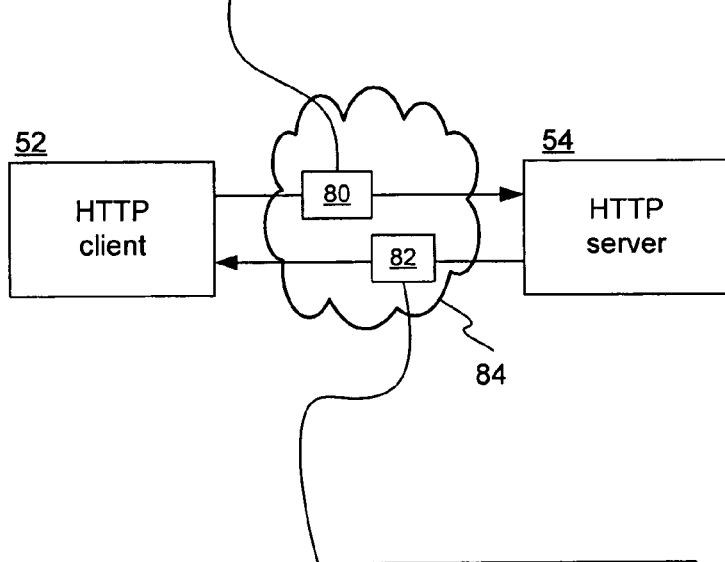
FIG. 2 shows an example HTTP request and an example HTTP response.
Figure 3:
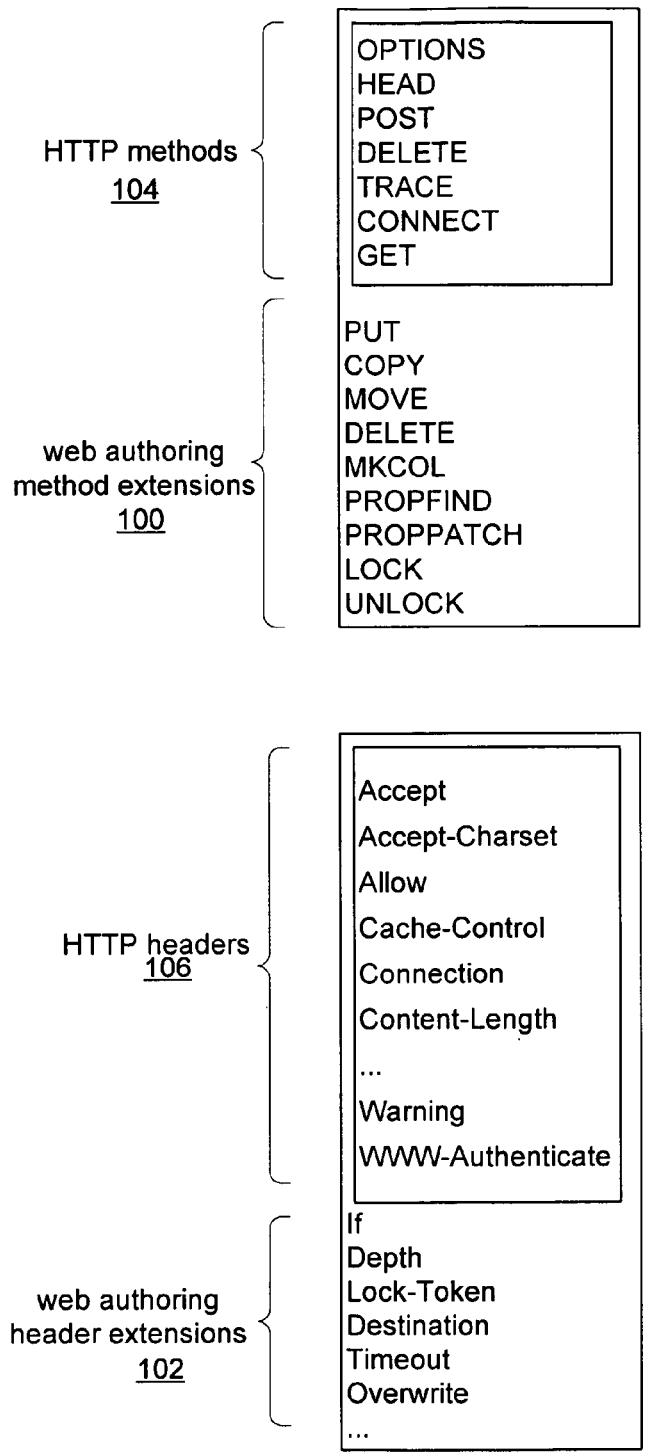
FIG. 3 shows some method extensions and header extensions of a protocol or extension of HTTP that adds remote authoring functionality on top of HTTP.
Figure 4:
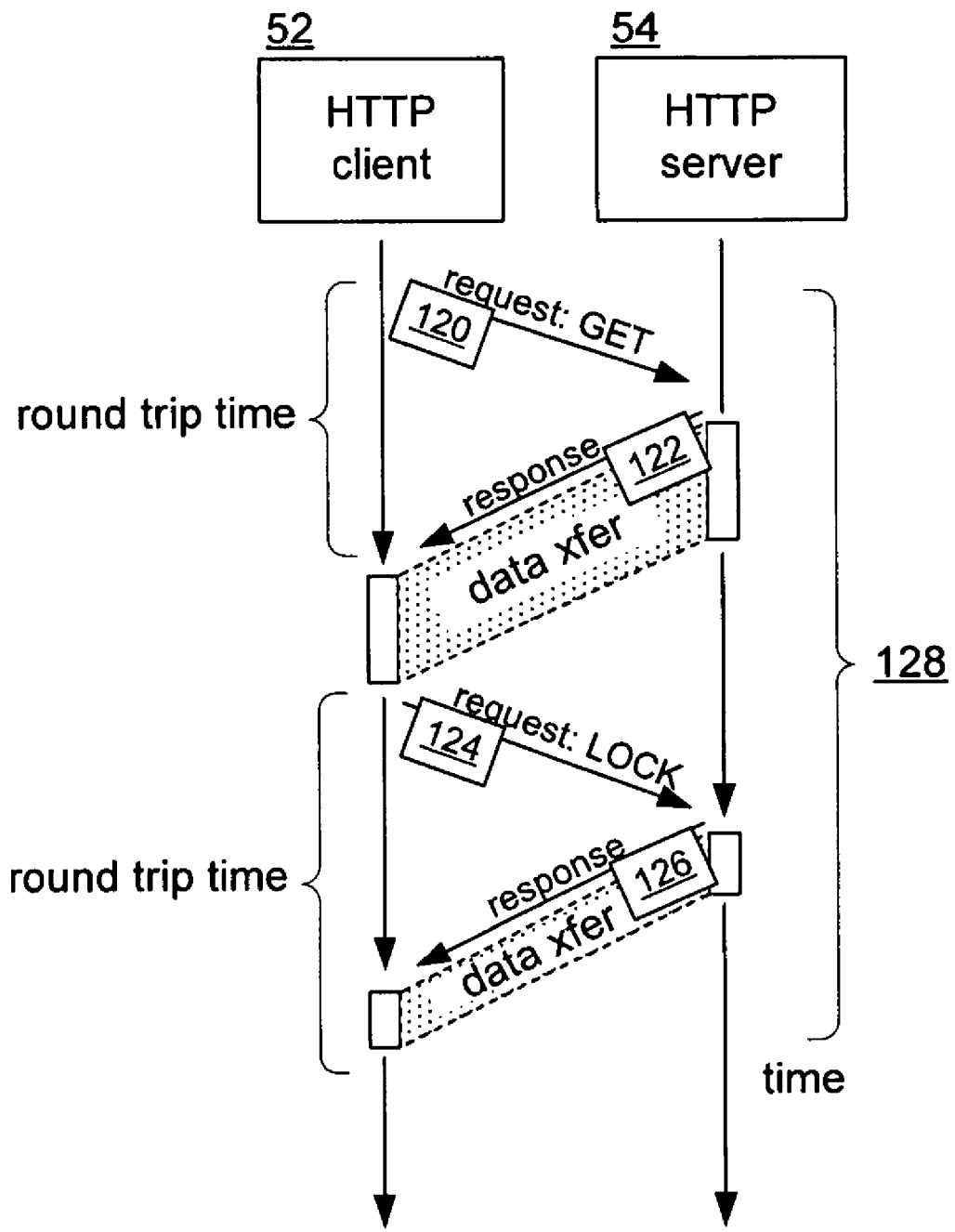
FIG. 4 shows a timeline for a sequence of related authoring requests.
Figure 6:
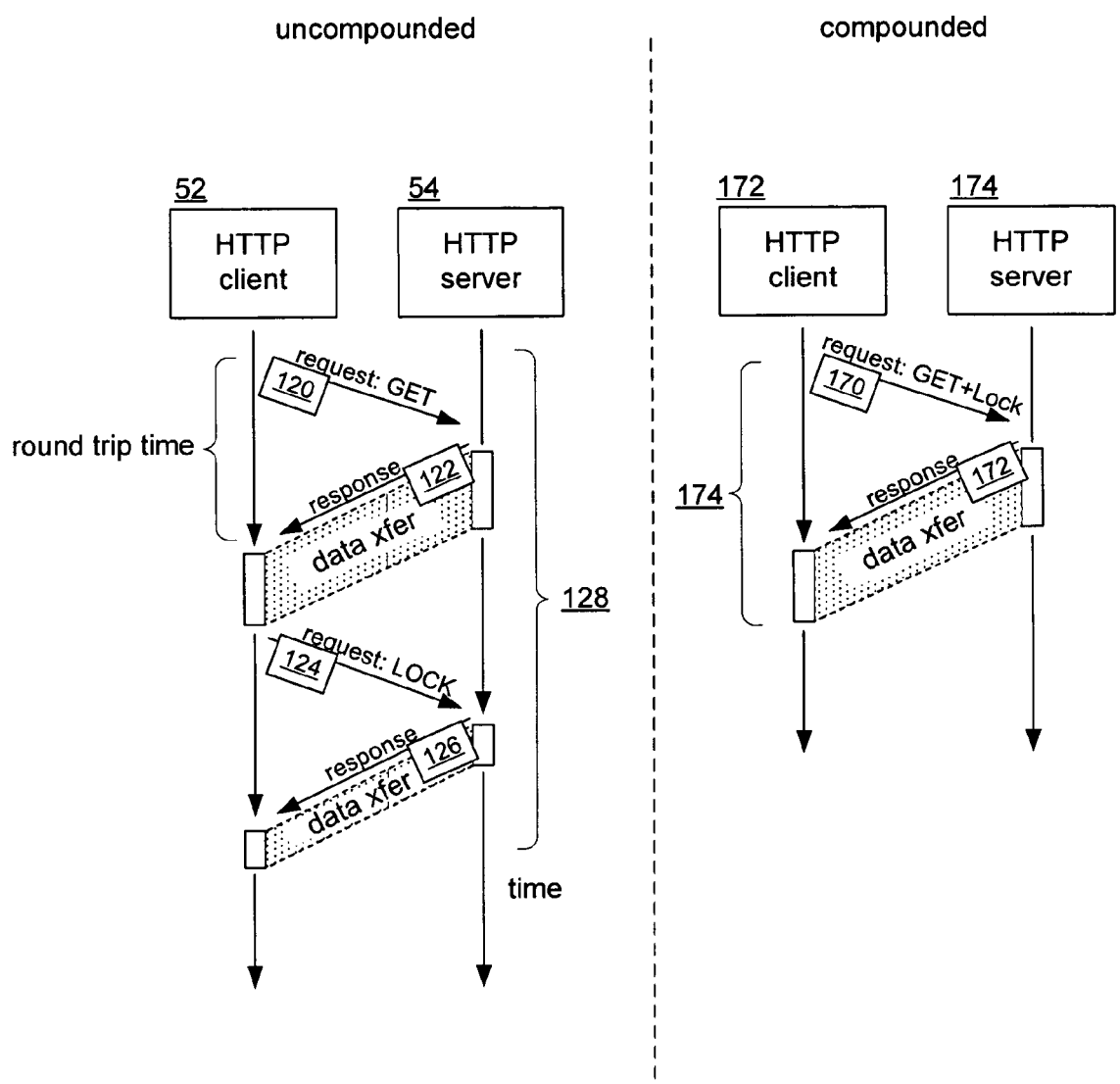
FIG. 6 shows an uncompounded authoring exchange and a compounded authoring exchange with a similar purpose.

FIG. 6 shows an uncompounded authoring exchange and a compounded authoring exchange with a similar purpose. The left hand side of FIG. 6—a repetition of FIG. 4—shows the flow of an uncompounded authoring exchange. The right hand side of FIG. 6 shows the flow of a compounded authoring exchange. On the right hand side of FIG. 6 (the compounded example), a single request message 170 is sent by the client 52. The request message 170 includes information indicating a GET operation directed to a resource on server 174 and information indicating that the server 174 is to also lock the resource for the client 172. In the compounded case, there is one exchange with the time of one round trip. The total transaction time 174 for the compounded request 170 is less than the total transaction time 128 of the uncompounded requests 120, 124. Furthermore, because the server 174 can tell from the request message 170 that a lock is desired, the server 174 can immediately lock the requested resource, thus preventing an intervening request from interfering with client 172's request.

Figure 7:
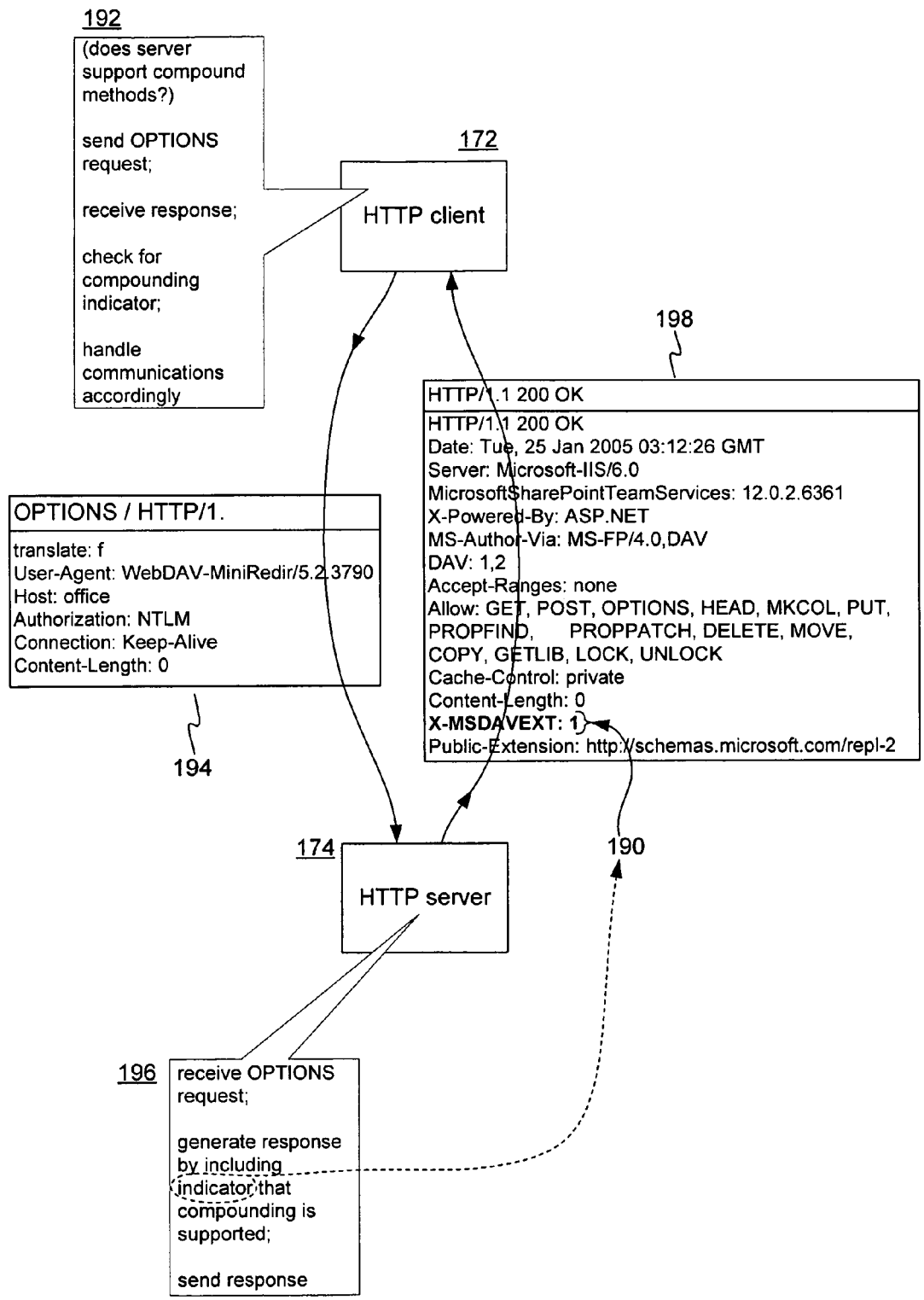
FIG. 7 shows how a client can determine if compounding is available on a server.

FIG. 7 shows how client 172 can determine if compounding is available on server 174. As mentioned earlier, it is desirable (but not necessary) for a client to be able to use both compounded and uncompounded authoring requests. It is also desirable for a server to be able to support both compounded and uncompounded authoring requests. A mechanism can be provided for this purpose. Preferably, the mechanism involves including information in a server response that indicates whether compounding is supported by the server. Although this information can take any form, the use of a new response header 190 is convenient because clients usually ignore unrecognized headers in an HTTP response. Furthermore, known algorithms for header parsing can be readily extended to process a new header or field name. In the alternative, a compounding indicator can take the form of a new value for a standard header, a special status line, etc.

To establish the availability of compounding, the client 172 performs a process 192 that starts with sending a standard OPTIONS request 194 (request 194 is only an example). A process 196 on the server 174 receives the OPTIONS request 194 and generates a response such as response 198 that includes a compounding indicator, in this embodiment, non-standard response header 190. The actual name of the non-standard response header 190 is not important other than it be known in advance by the client 172 so that when the client's 172 process 192 receives the response 198 it can recognize it and communicate with the server 174 as appropriate.

FIG. 8 shows how requests can be formatted to invoke compounded locking. The top part corresponds to the extended methods 144 (see FIG. 5) for GET or POST locking, and the lower part corresponds to the extended methods 146 for PUT locking. In one embodiment, ordinary HTTP and WebDAV request verbs 220 GET, POST, and PUT are compounded with locking requests using various combinations of a standard Lock-Token header 222 and a non-standard or extended lock timeout header 224, for example "X-MSDAV-EXTLock-Timeout". The lock timeout header 224 has a value of 0 or more seconds.

The lock timeout header 224 signifies the creation of a new lock according to the value of the lock timeout header 224. If the Lock-Token header 222 is included then the lock timeout header 224 signals the refresh of an existing lock. If the lock timeout header 224 is set to 0 seconds than an unlock is indicated (in this case, the Lock-Token header 222 and a correct token are required to unlock the file). Furthermore, a Lock-Token header 222 and token are preferably included in the response to any write operation on a locked resource. Example request 228 shows what a typical POST+UNLOCK request might look like. Note the inclusion of a Lock-Token header 222 and a lock timeout header 224.

Referring to the PUT verb combined with a locking operation, note that the Lock-token header 222 and correct token are needed to modify a locked resource. No token is needed if the resource is not locked. If no token is included but a lock time is specified, then the natural locking logic occurs; a lock is granted if no lock exists, and the PUT and lock are denied if a lock already exists. In sum, if the correct token is included with a PUT request the client can perform any PUT operation or any PUT operation combined with a lock operation. A typical PUT+REFRESH request is shown by request 230. The lock timeout value of 120 seconds indicates a refresh or resetting of the lifetime of the lock to run for another 120 seconds, and the lock token is the key that the server uses to authorize both the PUT operation and the REFRESH operation. In a preferred embodiment a Lock-Token header included in a non-write operation is ignored; i.e., "GET+ verify an existing lock" is not supported.

FIG. 9 shows a mechanism for compounding property methods with HTTP or WebDAV methods or verbs. These compound methods correspond to the methods 148, 150 in FIG. 5. The compounded property methods use two indicators; a special content type header value 240 (e.g., "multipart/MSDAVEXTPrefixEncoded") and a special extensions header 242 with various possible values such as "PROPFIND" and "PROPPATCH". The combinations in table 244 are self-explanatory and the resulting methods allow a resource to be accessed or modified while at the same time obtaining or setting one or more properties of the relevant resource. Furthermore, the standard Content-length header will be used and will give the value of the total message body or payload, which may also include properties as well resources (discussed further below).

In conformance with the rules of table 244, an example GET+PROPFIND request 246 is shown. Note the inclusion of an indication of the PROPFIND portion of the method in the form of the special extensions header 242 with the appropriate value or verb.

Although in one embodiment property related methods are compounded onto other methods using headers and a message body extension, other approaches may also be used. For example, the WebDAV PROPFIND and PROPPATCH methods could be overloaded using new headers. Furthermore, there are different ways for combining a resource and a set of properties in a message body. All of the properties can be put in separate headers, since most property sets are of manageable size. The properties could be assigned to respective different headers, although this would require more coding to handle transport of properties. In another embodiment, all of the properties (XML structure) can be placed in one large header, however, headers could potentially become larger than the buffers that some web servers allocate for header handling.

It is possible that some implementations may need to simultaneously set properties (PROPATCH) and get properties (PROPFIND) of a resource. For example, to determine whether a particular property was properly set, or to determine what a property was set to before it was changed with a PROPPATCH. In this case, "PROPPATCH" and "PROPFIND" can both be included, and a convention can be established for the location of sent and returned properties in the message body.

Although the WebDAV protocol does not specify particular properties for resources, some typical properties are analogous to properties of objects in a file system, for example content size, creation date, date of last modification, last modifying user, special folder type, resource tag, file attributes, creation time, last access time, last modified time, and so on.

FIG. 9 also shows an example GET+PROPFIND response 250. Note that the content type header field 240 signals the presence of a multi-part message body using the special "multipart/MSDAVEXTPrefixEncodedheader" extension. The lock related information is not required for the PUT+PROPPATCH method but may signify the presence of a server-side lock. The content type header field 240 signifies the presence of the multi-part message body 248 within a message body 64. Generally those multiple parts are divided by a length field followed by a corresponding data, in other words, the message body 64 carries one or more pieces of discrete data, each preceded by a corresponding length indicator. The sizes of the length fields and the sizes of their data add up to the standard Content-length header. The example response 250 in FIG. 9 happens to have a properties section and a resource section, each preceded by a respective length field, for example, a 64 bit integer. Because compound authoring is designed as an HTTP extension, the standard HTTP message body 64 is used. Because properties may need to be exchanged in a message that may also include a resource such as an HTML document, the length-data pairings allow both properties and resources to be carried in a same message body 64. The standard Content-length header gives the total length of the message body 64/248 and can be used, in conjunction with the length indicators, to parse out the substantive pieces of content in the message body 248.

Referring back to the methods 152, 154 in FIG. 5 (POST|GET+PROPFIND+LOCK|REFRESH|UNLOCK, PUT+PROPPATCH+LOCK|REFRESH|UNLOCK), these methods can be implemented by combining the properties and locking extensions discussed above. Because locking functionality and properties functionality is logically separate, the methods and headers discussed above can readily coexist in a message. FIG. 10 shows further compounded methods. The top message is an example of a PUT+PROPPATCH+UNLOCK request 270. Note the size of the body, including the size of the length fields, is 114234. The bottom message is an example of a corresponding response 272. A response that is successful need not differ from the response to a normal PUT request. The lack of a lock token header denotes a successful unlock. FIG. 11 shows an example POST+PROPFIND+LOCK method request 290 and a corresponding response 292. The request 290 causes the server to put a resource or file, set some properties, and unlock the file or resource.

FIG. 12 shows an error handling table and examples of a response 302 using extended error handling. A number of types of errors can occur when creating a resource on a server via an extended HTTP authoring request, for example, insufficient permissions, a resource checked out by another user or not checked at all, a quota violation, or a blocked filename or file type, the presence of a virus, etc. Other errors such as a missing property can occur when attempting to write to a file or resource. When an authoring error occurs on a server, typically the server may have rich system-level information about the error. Previously, when a module or server that implements WebDAV methods would encounters an error it would translate that error to a standard HTTP error code. A client might attempt to provide a useful message about the error code, perhaps using a corresponding hardcoded message string. However, the standard HTTP error codes are not rich enough to support the number and types of errors which users can encounter using extended HTTP authoring. Therefore, an extension is optionally provided to extend the error information fed back to a client, while keeping the existing HTTP error code, which allows for backward compatibility. This extended error handling is accomplished by including in responses information specific to system-level errors on the server.

As seen in FIG. 12, extended error handling can be realized using a new HTTP header, for instance "X-MSDAVEXT_ERROR: Decimal; String". The decimal portion is a code that maps to a system-level error such as a Unix file control error or a Win32 error. Preferably, the String portion is in UTF-8 format.

Regarding compounding extensions of web authoring protocols in general, it should be noted that some proxy servers may attempt to interpret requests and send back cached responses. Therefore, it is preferable that clients only use the new extensions or methods with POST rather than GET. Furthermore, when responding to a concatenated method or verb as discussed above, a server should mark a response to indicate that it should not be cached, using, for example, a header like "cache-control: private".

The server and client processes for using extended compound authoring methods are fairly straight forward given conventions as discussed above. Publicly available source code and documentation can be consulted to determine how to implement servers and clients with the functionality for performing atomic authoring methods and in particular locking and property functionality. This functionality can be performed in serial fashion when a compound method is encountered. For example, whereas previously a server may have had a function to handle a LOCK method and a function to handle a POST method, roughly, those functions can be invoked consecutively when a compounded POST+LOCK method is received.

Client Extended Error Handling

In various embodiments, a client may send a compounded or uncompounded web authoring request on behalf of an application program that creates a file system error at the server. The server may communicate extended error information for the file system error using any response message modified to include, for example, the X-MSDAVEXT_ERROR header as described with reference to FIG. 12 and further described below. The client may be arranged to process, store and manage the extended error information so that it may be consumed by various application programs. The client may process, store and manage the extended error information differently depending on whether a file handle for the requested file resource is available, as described in more detail with reference to FIGS. 15A and 15B.

In one embodiment, for example, the application programs may be modified to explicitly or implicitly request the extended error information. In one embodiment, for example, the extended error information may be automatically provided to the application programs as with standard error handling routines. Once an application program receives the extended error information, the application program may display the extended error information for a user. In some cases, an application program may be arranged to perform subsequent actions in response to the extended error information.

Figure 13:
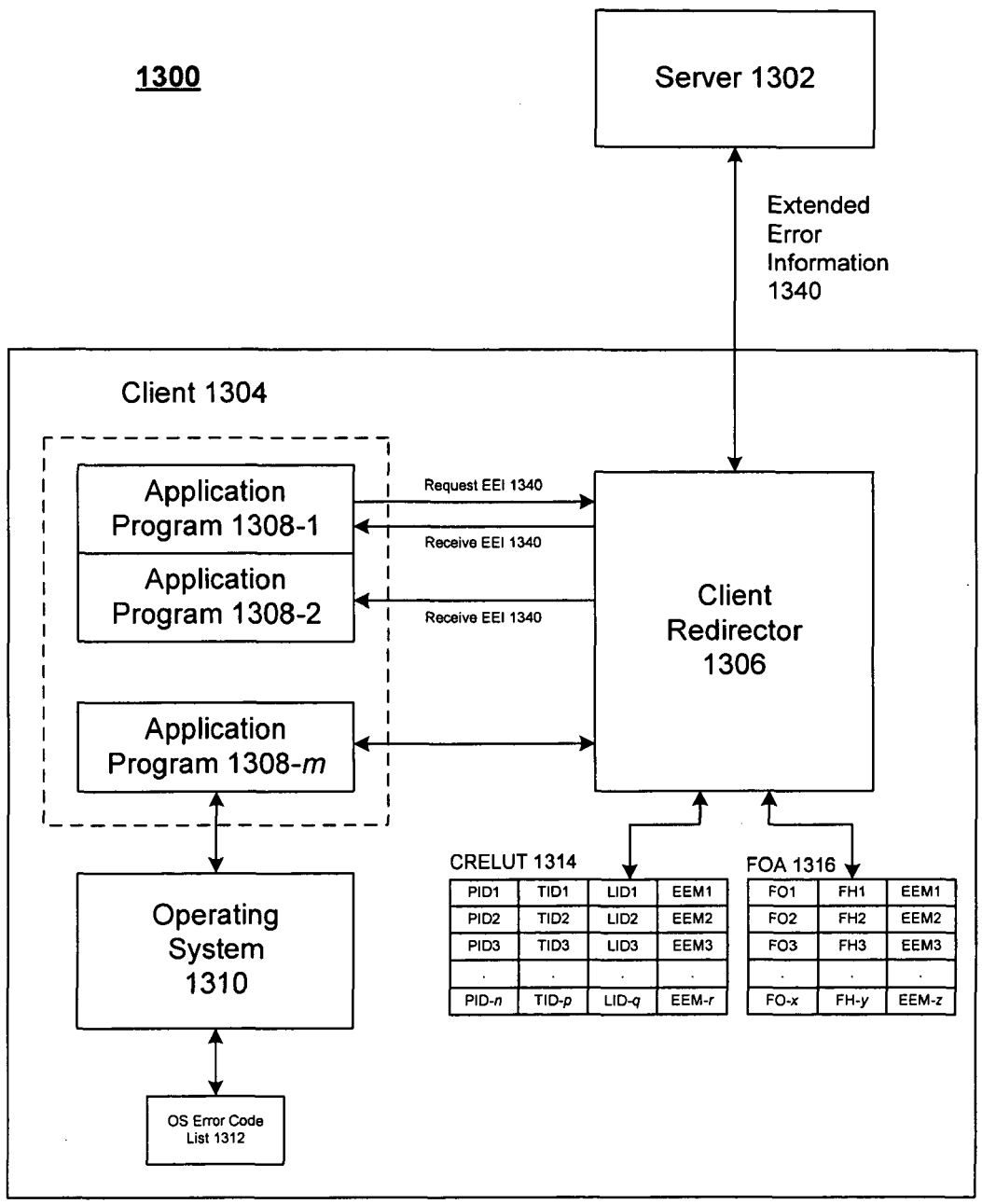
FIG. 13 shows how extended errors may be handled by a client.

FIG. 13 provides an example of how extended errors may be handled by a client. FIG. 13 illustrates a server 1302 coupled to a client 1304. client 1304 may include a client redirector 1306 coupled to a client redirector error look up table (CRELUT) 1314 and a file object array (FOA) 1316. Client redirector 1306 may also be coupled to multiple application programs 1308-1-m, where m represents any positive integer. Client 1304 may also include one or more operating systems 1310 as previously described. Operating system 1310 may further include an operating system error code list (OSECL) 1312. OSECL 1312 may include various types of standard operating system error codes (e.g., Win32 and NT error codes), and various types of standard protocol error codes (e.g., HTTP error codes), and so forth. The embodiments are not limited in this context.

In various embodiments, server 1302 and client 1304 may be implemented as HTTP, HTTPS, and/or WebDAV devices arranged to communicate extended error information 1340 as described with reference to FIG. 12. As used herein the term "extended error information" may comprise any error information beyond a static list of standard error codes and corresponding strings describing the error implemented for a given device or protocol. Server 1302 may use the extended error information to provide dynamic error information for file system errors that occur on server 1302 to various application programs 1308-1-m implemented by client 1304.

As previously described, the current errors returned by the HTTP protocol are not sufficient to support all of the possible error conditions that occur in file handling. Consequently, some embodiments may extend the HTTP errors using the X-MSDAVEXT_ERROR header. The extended error information may be used by application programs 1308-1-m to provide more specific information to the application user regarding a file system error that occurred on server 1302.

As illustrated in FIG. 12, the new header may be defined using the Augmented Backus-Naur Form (ABNF) Syntax as specified by the Institute of Electrical and Electronics Engineers (IEEE) RFC 2616, Section 2.1, as follows:

MSError-Header="X-MSDAVEXT_ERROR"":"Extended-error ";"Error-string

Extended-error=1 *DIGIT

Error-string=1 *TEXT where an Extended-error is an implementation-specific number that provides additional information about the cause of the HTTP error, an Error-string is a percentage encoded UTF-8 string giving additional explanatory text as to the cause of the error, as specified in section 2.1 of IEEE RFC 3986. In one embodiment, for example, the maximum length of the X-MSDAVEXT_ERROR header is limited to 1024 characters, although the embodiments are not limited in this respect.

In various embodiments, the X-MSDAVEXT_ERROR header as returned by server 1302 may be included in any suitable WebDAV server response. The following is an example response to a web authoring request to PUT a file that was checked out to another user:

HTTP/1.1 401 Unauthorized

Content-Length: 1656

Content-Type: text/html

X-MSDAVEXT_ERROR: 2342;

The%20file%20is%20checked%20out%20to%20%22 domain%5cusername %22

Server: Microsoft-IIS/6.0

WWW-Authenticate. NTLM

X-Powered-By: ASP.NET

It may be appreciated that other WebDAV responses may be modified to include the X-MSDAVEXT_ERROR header, or variant header, as desired for a given implementation. The embodiments are not limited in this context.

In general operation, assume server 1302 may need to transfer dynamic information on error conditions to the users in the form of extended error information 1340. For example, assume an application program 1308-1 sends an authoring request to server 1302 via client redirector 1306. If a server error occurs in response to the authoring request, server 1302 may send a response message with the X-MSDAVEXT_ERROR header.

Client redirector 1306 may attempt to retrieve extended error information 1340 from the X-MSDAVEXT_ERROR header in a number of different ways. For example, client redirector 1306 may query the HTTP header (X-MSDAVEXT_ERROR) for a string, and parse the string to retrieve extended error information 1340 in the form of an extended error code and an extended error code string containing the dynamic information to be sent to the user. In another example, the X-MSDAVEXT_ERROR header may include a list of parameters for extended error information 1340. Rather than forcing client 1304 to pull extended error information 1340 out of the X-MSDAVEXT_ERROR header, extended error information 1340 may be embedded within the X-MSDAVEXT_ERROR header in a well defined format. In this case, client redirector 1306 would then have a method to get both the string and the parameters. Such a modified X-MSDAVEXT_ERROR header could be implemented with the following format:

X-MSDAVEXT_ERROR; Full-String; Parameter-String

Once client redirector 1306 retrieves extended error information 1340, client redirector 1306 may store extended error information 1340 in order for application programs 1308-1-m to later query this data. Depending on whether a file handle has been generated for a given authoring request, client redirector 1306 may store extended error information 1340 as part of CRELUT 1314 or FOA 1316. In addition to providing standard error information (e.g., WIN32 error codes, NT error codes, HTTP error codes, and so forth), a new application program interface (API) may be defined to allow application programs 1308-1-m to further retrieve extended error codes and/or extended error strings as returned from server 1302 for the previous operation that failed. These and other client extended error handling operations may be described in more detail with reference to FIGS. 14, 15A and 15B.

Although FIGS. 14, 15A and 15B as described below are directed to examples of active management operations by client redirector 1306 and/or application programs 1308-1-m, it may be appreciated that certain embodiments may implement passive management operations for client redirector 1306 and/or application programs 1308-1-m as desired for a given implementation. For example, as an alternative to modifying an application program 1308-1-m to actively retrieve extended error codes managed by client redirector 1306, client redirector 1306 may be arranged to automatically pass extended error information directly to application programs 1308-1-m. To accomplish this, a tunnel may be formed between server 1302 and application programs 1308-1-m through client redirector 1306. In this manner, client redirector can still handle the extended error codes which it was not previously aware of by storing them and passing them to application programs 1308-1-m without necessarily performing any processing on the extended error codes. This arrangement may allow an improved server implementation and an improved application program to communicate effectively without necessarily requiring a modified client redirector 1306. The embodiments are not limited in this context.

Figure 14:
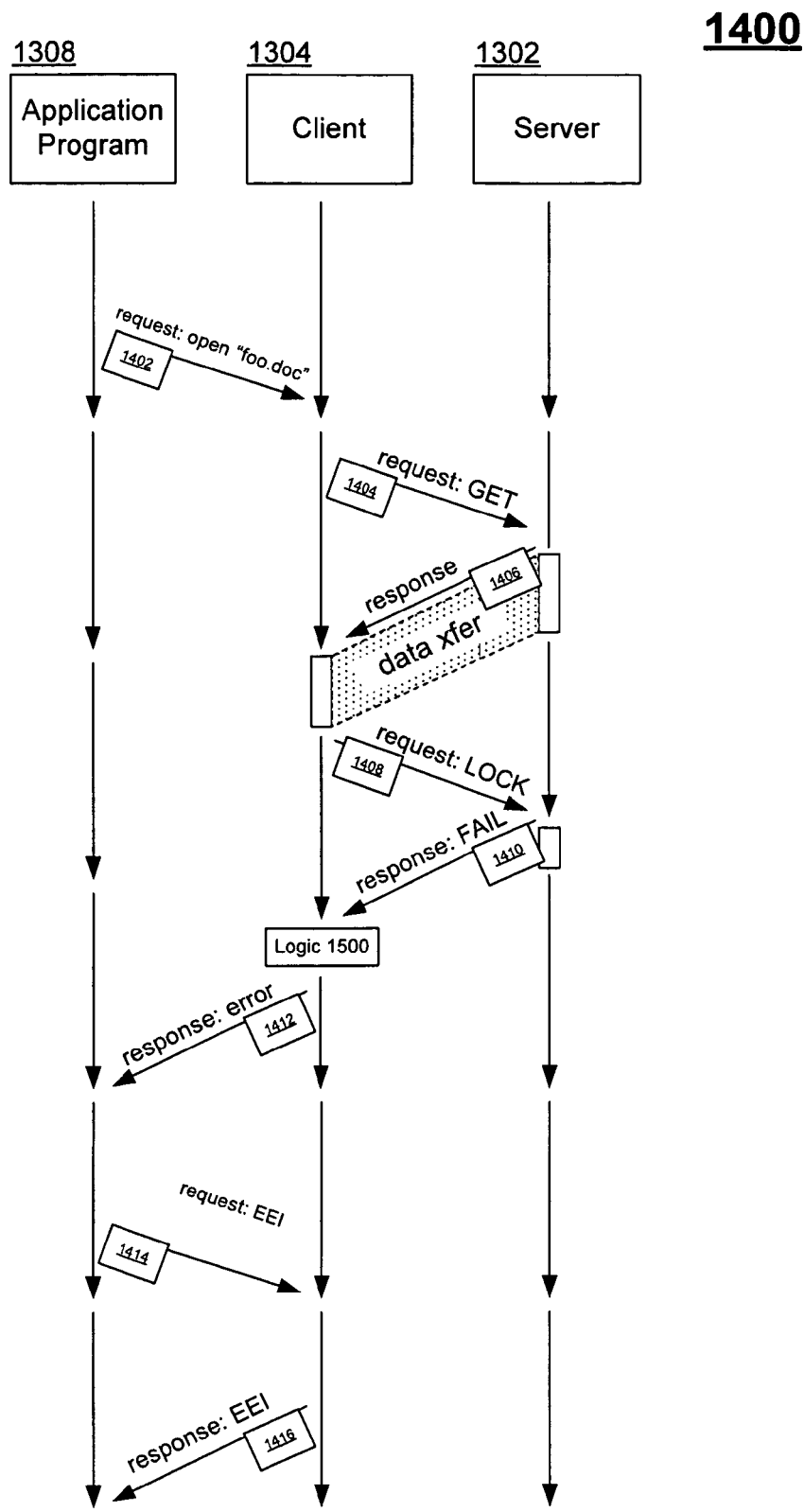
FIG. 14 shows an extended error message flow.

FIG. 14 shows a first extended error message flow. FIG. 14 illustrates an extended error message flow 1400 providing an example of a message flow between server 1302 and client 1304. As shown in FIG. 14, assume that a user of client 1304 would like to get and lock a resource on server 1302. The user will first direct an application program 1308-1-m to generate an authoring request to get a particular resource. For example, application program 1308-1 may generate and transmit an authoring request 1402 for a file named "foo.doc" to client redirector 1306 of client 1304. Client 1304 will generate and transmit a GET request 1404 for "foo.doc" to server 1302. Server 1302 handles the GET request 1404 and returns an appropriate response 1406, such as a "Success 200" indicating that the file "foo.doc" has been located. Server 1302 may then transfer the file "foo.doc" to client 1304.

Once client 1304 receives the file "foo.doc," client 1304 may then need to lock the file "foo.doc" so that other users cannot modify the file while checked out to client 1304. Client 1304 may therefore generate and transmit a LOCK request 1408. Assume that another user has previously checked out the file "foo.doc" prior to server 1302 receiving the LOCK request 1408 from client 1304. In this case, server 1302 may respond with a FAIL response 1410. Server 1302 may generate FAIL response 1410 as an HTTP header comprising the X-MSDAVEXT_ERROR header with extended error information 1340. For example, the X-MSDAVEX-T_ERROR header may be generated as follows:
HTTP/1.1 1401 Unauthorized
Content-Length: 1656
Content-Type: text/html
X-MSDAVEXT_ERROR: 2342,
The%20file%20is%20checked%20out%20to%20%22
domain%5cusername%22
Server: Microsoft-IIS/6.0
WWW-Authenticate. NTLM
X-Powered-By: ASP.NET
Where the extended error code is "2342" and the extended error code string is "The file foo.doc is checked out to user name John Doe." Server 1302 may transmit FAIL response 1410 to client 1304.

Once client 1304 receives FAIL response 1410 with the X-MSDAVEXT_ERROR header, client 1304 may be arranged to process FAIL response 1410 in a number of different ways as indicated by logic 1500. Examples of two different handling techniques may be described with reference to respective FIGS. 15A, 15B below. Once processed, client 1304 may send an ERROR response 1412 with standard error information to application program 1308-1. For example, ERROR response 1412 may include a standard Win32 error code used by operating system 1310 and OSECL 1312. Application program 1308-1 may call a routine passing the standard Win32 error code as a parameter to retrieve a standard Win32 error message, which is typically a hard coded string from the Shell.

Assuming application program 1308-1 needs additional error information, application program 1308-1 may call a new API arranged to further retrieve extended error codes and/or extended error strings as returned from server 1302 for the previous operation that failed, as indicated by extended error information (EEI) request 1414. Client 1304 may retrieve the requested extended error information 1340, and pass extended error information 1340 to application program 1308-1 via EEI response 1416.

Application program 1308-1 may receive extended error information 1340, and then perform any number of defined actions with extended error information 1340 or in response to extended error information 1340. For example, application program 1308-1 may display the extended error code string with "The file foo.doc is checked out to user name John Doe" to the user. In another example, the defined actions may include other subsequent processing operations, such as automatically generating an email to "John Doe" requesting access or status of the file "foo.doc." It may be appreciated than any number of defined actions may be implemented by a given application program 1308-1-m as desired for a given implementation. The embodiments are not limited in this context.

Referring again to logic 1500, as far as client redirector 1306 is concerned extended error information 1340 could be generally classified into two categories. The first category includes those types of errors that are not bound to a file handle. Examples of first category errors may include errors generated in response to CREATE request. The second category includes those types of errors that are bound to a file handle. Examples of second category errors may include errors generated in response to READ and WRITE requests. Client redirector 1306 may handle each category differently as described by FIGS. 15A, 15B.

Figure 15A:
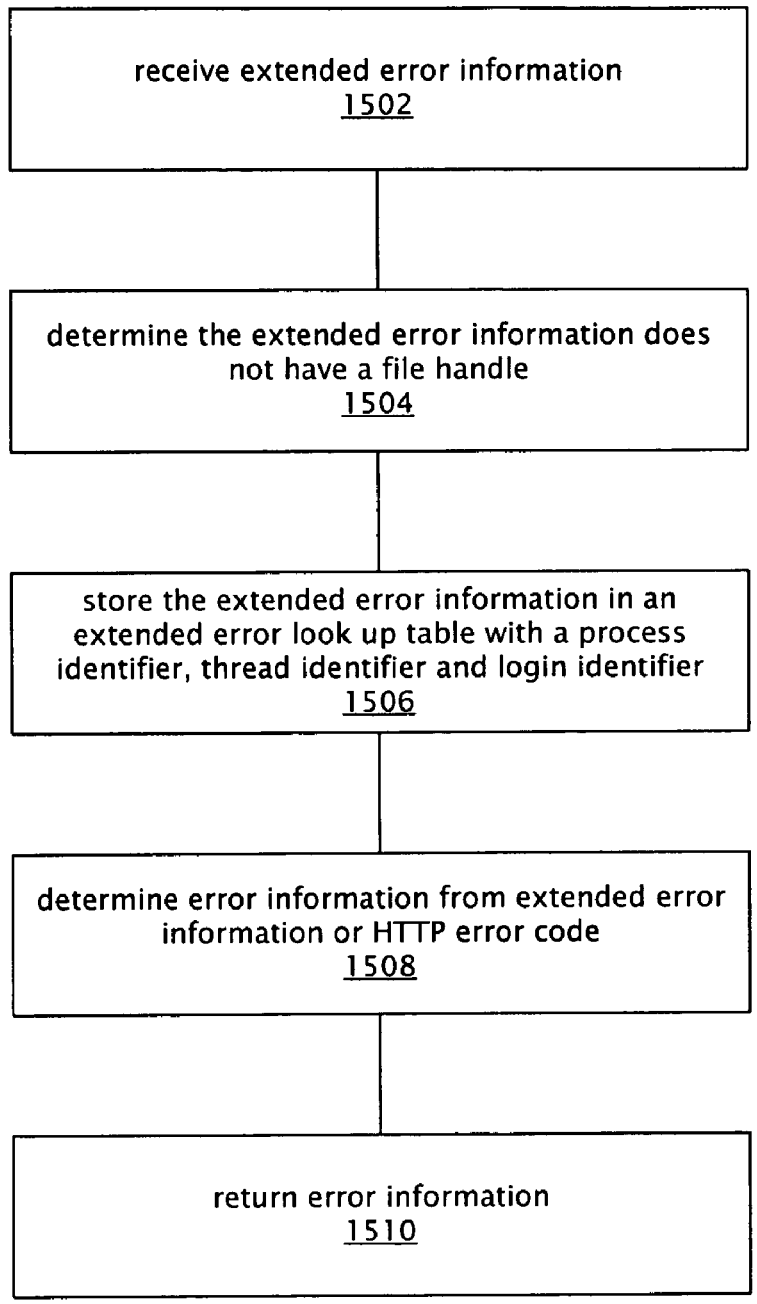
FIG. 15A shows a first logic flow.

FIG. 15A shows a first logic flow. FIG. 15A illustrates a first logic flow 1500A that is representative of processing operations performed by client redirector 1306 of client 1304 upon receiving extended error information 1340. As shown in FIG. 15A, logic flow 1500A receives extended error information 1340 at block 1502. Logic flow 1500A performs a check and determines extended error information 1340 does not have a file handle at block 1504.

In one embodiment, for example, logic flow 1500A may store extended error information 1340 in an extended error look up table such as CRELUT 1314, with CRELUT 1314 including a process identifier, a thread identifier and a login identifier, at block 1506. Client redirector 1306 may process errors that are not bound to a handle differently from those errors that are bound to a handle. To accommodate the errors not bound to a handle, client redirector 1306 will maintain these errors using CRELUT 1314. CRELUT 1314 may comprise a global hash table with the hash key obtained using a process identifier (ID) such as PID1-n, a thread ID such as TID1-p, and a Login ID such as LID1-q, where n, p and q are positive integers. In one embodiment, for example, a maximum of 1024 entries is allowed for CRELUT 1314 with an expiration time of 60 seconds. The requests do not necessarily need to be actively cleaned up. For example, this may be accomplished on an as-needed basis, such as when the maximum limit is reached and an entry needs to be added.

In one embodiment, for example, logic flow 1500A may determine error information from extended error information 1340 or a HTTP error code at block 1508. In some cases, client redirector 1306 may generate standard error information for application program 1308-1. For example, client redirector 1306 may use various error mapping tables to facilitate this determination.

In one embodiment, for example, client redirector 1306 may use an error mapping table that maps extended error codes directly to standard error codes. An example of such an error mapping table is provided in the following Table 1:

TABLE 1

| Extended Error | NT Status Code | Win32 Error Code (Decimal) | Meaning |
|---|---|---|---|
| 0x0009000E | 0xC0000901 | 220 | V_DOC_CHECKED_OUT (The file is locked or checked out, so the request failed.) |
| 0x00090075 | 0xC0000902 | 221 | V_CHECKOUT_REQUIRED (The file must be checked out for the request to succeed.) |
| 0x0009006F | 0xC0000903 | 222 | V_BAD_FILETYPE_NO_URL (The server has blocked the file because of its type.) |
| 0x0006000A | 0xC0000904 | 223 | V_SHTML_REQUEST_TOO_LONG (The request is too long.) |
| 0x000E0098 | 0xC0000905 | 224 | V_FORMS_AUTH_NOT_BROWSER (We are in forms-based auth mode, and the client didn't send authorization cookies.) |
| 0x00960004 | 0xC0000906 | 225 | V_VIRUS_INFECTED_UL (The file was infected with a virus and was unable to be uploaded.) |

TABLE 1-continued

| Extended Error | NT Status Code | Win32 Error Code (Decimal) | Meaning |
|---|---|---|---|
| 0x00960009 | 0xC0000906 | 225 | V_VIRUS_INFECTED_BLOCKED_DL (The file was infected with a virus and was unable to be downloaded.) |
| 0x00960008 | 0xC0000907 | 226 | V_VIRUS_DELETED_DL (The file was infected with a virus and was deleted because the virus had already removed all the content.) |
| 0x00090070 | 0xC0000033 | 123 | V_BAD_CHARS_IN_URL (The server doesn't support the URL.) |
| 0x00090071 | 0xC0000033 | 123 | V_NO_RENAME_TO_THICKET_FOLDER (The server detected the rename would have made a normal folder into a thicket supporting folder.) |
| 0x00090068 | 0xC0000106 | 206 | V_URL_TOO_LONG (The URL was rejected because it was too long.) |
| 0x00090063 | 0xC0000801 | 1295 | V_OVER_QUOTA (The change was rejected because the target site is over its disk quota.) |
| UNKNOWN | 0x00000000 | 0 | |

In such cases, client redirector 1306 retrieves the numeric portion of the error and attempts to map it using Table 1. If the mapping is successful, the resulting Win32 error code is returned to the calling application program 1308-1-m. If not, extended error information 1340 is returned as success, and only the string will be available for the calling application program 1308-1-m. The string portion of the extended error is passed to the calling application program 1308-1-m. The calling application program 1308-1-m may then use the string to provide more information to a user, which may be useful to identify, troubleshoot or respond to the underlying problem that created the error.

In one embodiment, for example, client redirector 1306 may use a mapping table such as shown in Table 1 to retrieve a standard error code from extended error information 1340. Referring again to our previous example, assume extended error information 1340 includes the extended error code of 0x0009000E. As shown in Table 1, this may map to a Win32 error code (in decimal) of 220. Such mapping operations may reduce the need for server 1302 to communicate standard error codes in addition to extended error information, thereby decreasing communication traffic and increasing communication efficiency, as well as provide other advantages.

In various embodiments, client redirector may also use other error mapping tables to determine standard error codes for use by application programs 1308-1-m. For example, standard protocol error codes such as HTTP errors may be directly mapped to Win32 error codes. In some cases, this could operate as a default mapping since all HTTP errors typically have a matching Win32 error code.

In various embodiments, client redirector 1306 may perform error code translations according to various sets of ordering rules. For example, if a client mapping from the extended error code to the Win32 error code exists, then client redirector 1306 may use this mapping. All legacy client applications will be able to display the Win32 message, while newer application programs will be able to access the extended error code string for extended error information. If the extended error information header is present, but the error is unknown to client redirector 1306, client redirector 1306 could fallback to the HTTP error code. Client application programs understanding extended error information would be able to get the extended error code string to display instead of the less useful static mapping. If there is no extended error information header present, client redirector 1306 could simply use the HTTP error code as in conventional techniques.

Once client redirector 1306 determines the standard error code, logic flow 1500A returns the standard error information to the application program 1308-1-m at block 1510. This may be accomplished via ERROR response 1412 as previously described with reference to FIG. 14.

Figure 15B:
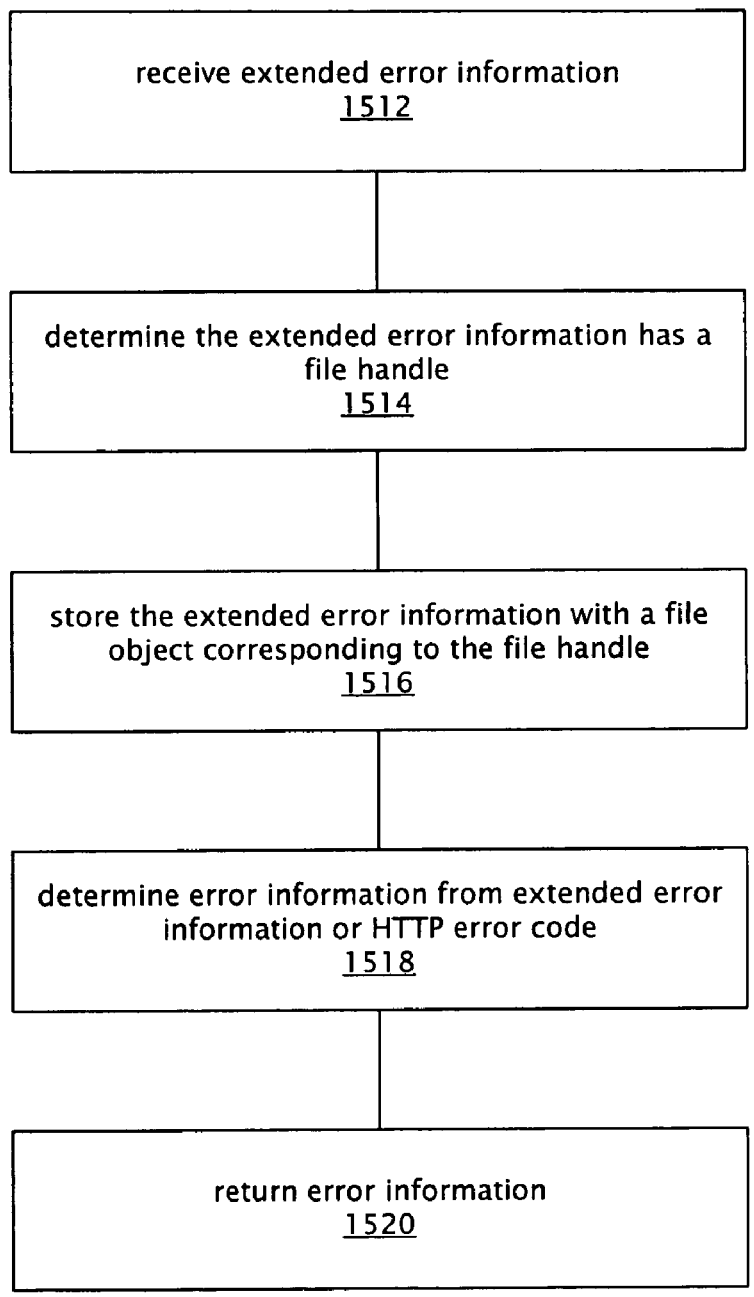
FIG. 15B shows a second logic flow.

FIG. 15B shows a second logic flow. FIG. 15B illustrates a second logic flow 1500B that is representative of alternative processing operations performed by client redirector 1306 of client 1304 upon receiving extended error information 1340. Similar to logic flow 1500A, logic flow 1500B receives extended error information 1340 at block 1512. Unlike logic flow 1500A, however, logic flow 1500B performs a check and determines extended error information 1340 does have a file handle at block 1514.

In one embodiment, for example, logic flow 1500B stores extended error information 1340 with a file object corresponding to the file handle at block 1516. The existence of a file handle makes storing and retrieving extended error information 1340 somewhat less complex than without a file handle. Consequently, to accommodate these errors client redirector 1306 will maintain these errors on the file handle (FOBX) using FOA 1316. FOA 1316 may include a file object such as FO1-x, a file handle such as FH1-y, and EEI1-z, where x, y and z represent positive integers. The file handle may then be used to retrieve extended error information 1340 by directly searching FOA 1316, rather than using the more complex hashing routines implemented for CRELUT 1314.

Similar to logic flow 1500A, logic flow 1500B may determine error information from extended error information 1340 or a HTTP error code at block 1518. Once client redirector 1306 determines the standard error code, logic flow 1500B returns the standard error information to the application program 1308-1-m at block 1520. This may be accomplished via ERROR response 1412 as previously described.

Once extended error information 1340 has been processed and stored by client redirector 1306, application programs 1308-1-m may receive extended error information 1340 in a number of different ways. For example, application program 1308-1 may be arranged to explicitly or implicitly request extended error information 1340 from client redirector 1306. This may be accomplished using various API or DLL functions. An example of a suitable API that application program 1308-1 may use to get extended error information 1340 may be illustrated as follows:

```
DWORD
DavGetExtendedError(
    in HANDLE hFile,
    in DWORD *ExtError,
    in_ecount(*cChSize) LPWSTR ExtErrorString,
    inout DWORD *cChSize
    )
/*++
```

The DavGetExtendedError( ) routine may be called by application program 1308-1 to retrieve extended error information 1340 for an extended error code returned from server 1302 for the previous operation that failed. The DavGetExtendedError( ) routine may include the following arguments:

hFile—Handle to the file for which the extended error code is to be retrieved. INVALID_HANDLE_VALUE indicates the retrieval of an error code on a create that was done on this thread earlier.

ExtError—Pointer to a DWORD location which receives the extended error value on Success.

ExtErrorString—Pointer to a string which receives the extended error string on Success.

cChSize—Pointer to a DWORD location which contains the size in chars of the buffer pointed by ExtErrorString on input and receives the actual number of chars copied on output.

The DavGetExtendedError( ) routine may include the following returns:

ERROR_SUCCESS—The call was successful.

ERROR_INVALID_PARAMETER—If the call was made for the retrieval of an error code after a successful operation.

ERROR_MISC—Some other Win32 error code.

Although HTTP and WebDAV have been discussed above, the ideas discussed above are expected to be applicable to any future variations or versions of HTTP and WebDAV. Furthermore, a standard protocol is considered to refer to any future or current standard protocol.

In conclusion, those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile or non-volatile computer or device readable medium. This is deemed to include at least media such as CD-ROM, magnetic media, flash ROM, etc., storing machine executable instructions, or source code, or any other information that can be used to enable a computing device to perform the various embodiments. This is also deemed to include at least volatile memory such as RAM storing information such as CPU instructions during execution of a program carrying out an embodiment.

The invention claimed is:

1. An article comprising a computer-readable storage medium that stores instructions, the computer-readable storage medium not consisting of a transitory signal, execution of the instructions by a computing device causing the computing device to:

send an authoring request to a server, the authoring request complying with a WebDAV protocol, the authoring request instructing the server to perform a resource management operation on a file; and send an extended error code and an extended error text string to an application program after the computing device receives a response message from the server, the response message complying with the WebDAV protocol, the response message comprising a status line and an extended error information header line, the status line defined in the WebDAV protocol, the extended error information header line defined in an extension to the WebDAV protocol, the extended error information header line comprising a field name and extended error information, the extended error information including the extended error code and the extended error text string, the extended error code comprising a number that provides information about a cause of a file system error that occurred during performance of the resource management operation on the file, the extended error text string comprising explanatory text as to the cause of the file system error, the extended error code and the extended error text string not defined in either the HTTP protocol or the WebDAV protocol.

2. The article of claim 1, wherein execution of the instructions by the computing device causes the computing device to:

determine that the extended error information does not have a file handle; and after determining that the extended error information does not have a file handle, store the extended error information in an extended error look up table with a process identifier, thread identifier and login identifier.

3. The article of claim 2, wherein execution of the instructions by the computing device causes the computing device to retrieve the extended error information from the extended error look up table if the extended error information does not have a file handle.

4. The article of claim 1, wherein execution of the instructions by the computing device causes the computing device to:

determine that the extended error information does have a file handle; and after determining that the extended error information has the file handle, store the extended error information with a file object corresponding to the file handle.

5. The article of claim 4, wherein execution of the instructions by the computing device causes the computing device to retrieve the extended error information from the file object if the extended error information has the file handle.

6. The article of claim 1, wherein the extended error code is a system error code of the server.

7. An article comprising a computer-readable storage medium containing instructions, the computer-readable storage medium not consisting of a transitory signal, execution of the instructions by a computing device configuring the computing device to:

send an authoring request to a server, the authoring request complying with a WebDAV protocol, the authoring request instructing the server to perform a resource management operation on a file;

receive a response message from the server in response to the authoring request, the response message complying with the WebDAV protocol, the response message comprising a status line and an extended error information header line, the status line defined in the WebDAV protocol, the extended error information header line defined in an extension to the WebDAV protocol, the extended error information header line comprising a field name and extended error information, the extended error information comprising an extended error code and an extended error text string, the extended error code comprising a number that provides information about a cause of a file system error that occurred during performance of the resource management operation on the file, the extended error text string comprising explanatory text as to the cause of the file system error, the extended error code and the extended error text string not defined in either the HTTP protocol or the WebDAV protocol;
use the extended error code to identify a standard error code, the standard error code being standard to an operating system of the computing device;
return the standard error code to an application program;
after returning the standard error code to the application program, receive a request from the application program for the extended error information;
determine whether the extended error information has a file handle;
when the extended error information has a file handle:
  store the extended error information with a file object corresponding to the file handle; and
  use the file handle to retrieve the extended error information;
when the extended error information does not have a file handle:
  store the extended error information in an extended error look up table with a process identifier, a thread identifier, and a login identifier; and
  use the process identifier, the thread identifier, and the login identifier to retrieve the extended error information from the extended error look up table; and
send the extended error information to the application program.

8. The article of claim 7, wherein execution of the instructions by the computing device causes the computing device to:
parse the response message for the extended error information header line; and
extract from the extended error information header line the field name, the extended error code, and the extended error text string.

9. An article comprising a computer-readable storage medium containing instructions, the computer-readable storage medium not consisting of a transitory signal, execution of the instructions by a computing device configuring the computing device to:
send an authoring request to a server via a client redirector, the authoring request complying with a WebDAV protocol, the authoring request instructing the server to perform a resource management operation on a file;
receive error information from the client redirector after the client redirector receives a response message from the server, the response message comprising a status line and an extended error information header line, the status line defined in the WebDAV protocol, the extended error information header line defined in an extension to the WebDAV protocol, the error information containing a standard error code used by an operating system of the computing device, the extended error information header line containing a field name, an extended error code, and an extended error text string, the extended error code comprising a number that provides information about a cause of a file system error that occurred during performance of the resource management operation on the file, the extended error text string comprising explanatory text as to the cause of the file system error, the extended error code and the extended error texts string not defined in either the HTTP protocol or the WebDAV protocol, the response message being responsive to the authoring request and conforming to the WebDAV protocol; and
receive the extended error text string from the client redirector; and
display the extended error text string to a user.

10. The article of claim 9, wherein execution of the instructions by the computing device causes the computing system to send a request for the extended error text string to the client redirector.

11. The article of claim 9, wherein execution of the instructions by the computing device causes the computing device to:
retrieve the extended error code;
send a request to an operating system for a string associated with the extended error code; and
display the string associated with the extended error code.

12. The article of claim 9, wherein execution of the instructions by the computing device causes the computing device to receive the extended error text string with an indication of a server-side error.

* * * * *